3,697,387
PROCESS AND DEVICE FOR THE PURIFICATION OF A MIXTURE OF ORGANIC SUBSTANCES OF HIGH MOLECULAR WEIGHT
Hans Joachim Munch, Frankendorf, Switzerland, assignor to Buss A.G., Basel, Switzerland
Filed May 13, 1969, Ser. No. 824,071
Claims priority, application Sweden, May 16, 1968, 7,504/68
Int. Cl. B01d 3/04, 3/10
U.S. Cl. 203—72  8 Claims

ABSTRACT OF THE DISCLOSURE

A process for the purification of a mixture of organic substances of high molecular weight, which comprises conveying the mixture continuously in even flow through a plurality of heating and cooling zones under vacuum, while first adding sufficient heat to the mixture for evaporating substantially all of the first running fraction together with a small portion of the middle fraction, thereafter subjecting the distillate so obtained to rectification so as to obtain a pure product of first quality, which is withdrawn, and a slightly impure product of second quality, and continuing the purification process by evaporating the residual mixture remaining after withdrawal of the first-quality product, in additional heating stages followed by condensations, to obtain further amounts of first-quality products, the heat energy of the hot vapors and the hot condensates being utilized for said rectification. The invention also comprises a device for carrying out the above process.

Figure 1:
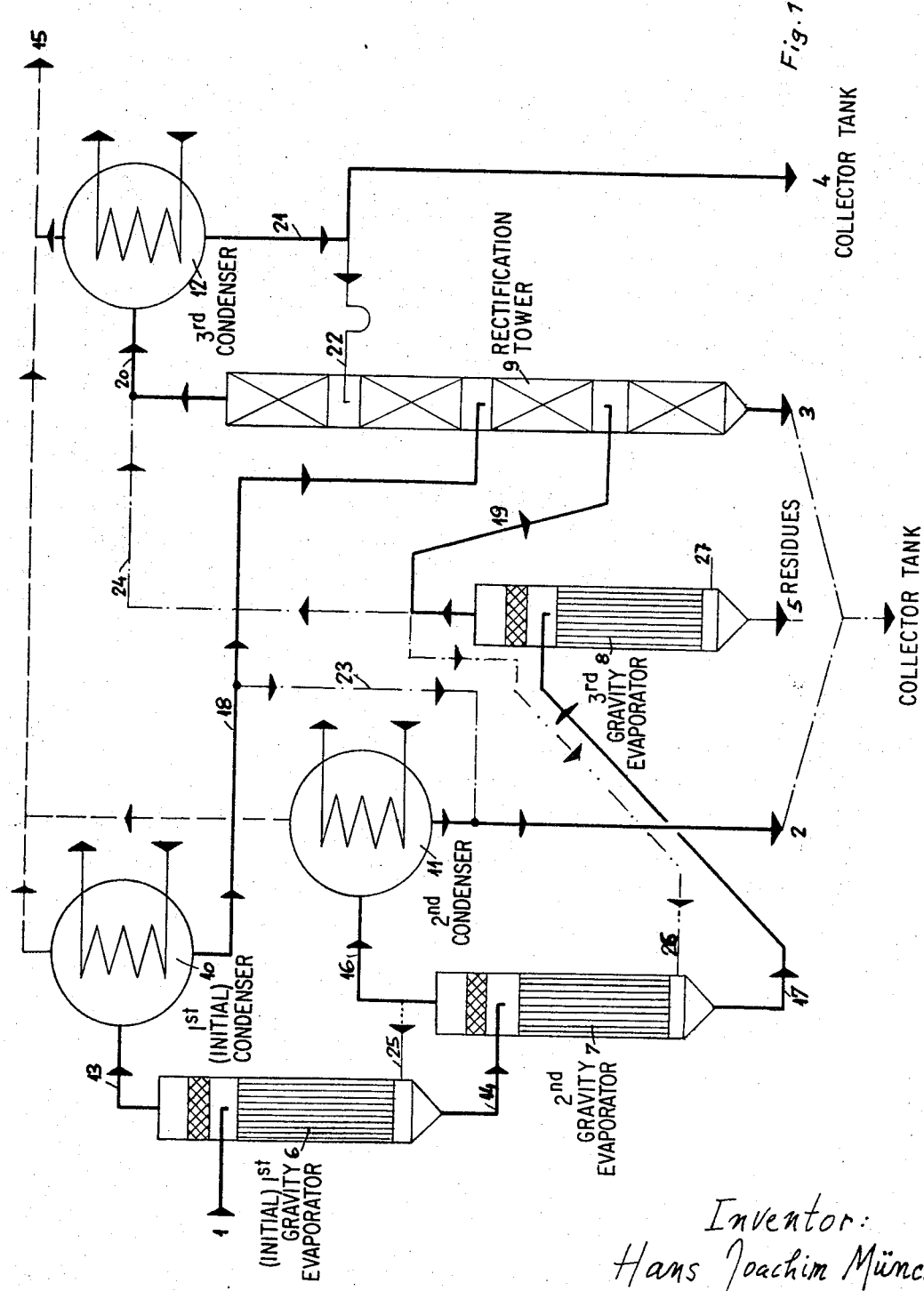

It is common knowledge that mixtures of organic substances with high molecular weights can be separated only with difficulty if the molecular weight and boiling point are closely adjacent and the middle fractions are present in a relatively high proportion. When fractionating by conventional processes, repetitive boiling of such mixtures by introducing heat from external sources cannot be avoided, and if some of the constituents tend to form decomposition products when subjected to protracted heating it will be extremely difficult to obtain products in the desired degree of purity. In addition, great expenses and a high rate of yield loss are involved.

The known continuous processes for the distillation of fatty acids operate in the main under conditions which make it impossible to completely prevent a portion of the fatty acids from becoming exposed to excessive heating at some points in the installation where no or little movement occurs while they are subjected to vaporization. This causes disadvantages, to the extent that local overheating produces traces of decomposition and polymerization products which impair the color and odor of the final product, or which, generally reduce the yield.

Undesirable results will also be obtained when a given installation of conventional design is operated under milder conditions to avoid the danger of overheating; this entails reducing the throughput sufficiently to allow impurities to evaporate even at low vaporization temperature. But increased time of stay in turn offers greater possibility of new impurities being formed by decomposition.

Numerous suggestions have been made to overcome these disadvantages and to promote the movement of material and continuous flow through the heated zone, and thus to prevent decomposition of the fatty acids and their accompanying substances. But all the measures so far published have led either to partial success only, or gave rise to new problems and new disadvantages.

Thus conventional installations with narrow vaporization towers have utilized multi-stage trays fitted with an overflow, the tray being sometimes directly heated. In this arrangement it has been found that a vaporization tower operates the more efficiently, the greater the number of trays that are provided, since these enable the individual layers of fatty acid to be kept shallow. Live steam is blown in as an additional means for vigorously agitating the fatty acid in the individual layers However vaporization must take place under vacuum and the large number of trays leads to considerable loss of pressure, which has to be compensated by heating the lower trays to an undesirable degree. It would be better to admit steam by injection to each tray individually and to provide each with a separate exhaust for volatilized products, but methods of this nature have so far met with too many design and process engineering difficulties. None the less, certain processes have been reported as utilized in practice which could be considered as a compromise solution, such as dividing the vacuum in the tower by a hydraulic seal, perhaps half way up. But this method necessarily involves the disadvantage that the sump of the tower must be heated quite intensely and that the vacuum is primarily applied to the lower portion of the tower, while the upper portion is under a weak vacuum only and must therefore be heated more intensely.

Others operate with large-area, flat containers the heated bottom of which is subdivided into individual trays by vertical partition walls around which the fatty acid meanders, fresh steam again being blown in to flush out the points where no movement occurs. Segments are open at the top and have a joint vacuum extraction system which may be fitted with a tower superstructure for raw fatty acid infeed where odorous substances are, to some extent, pre-cleaned before the major portion reaches the bubble-cap and is evaporated. These installations must again be operated very carefully if local overheating is to be avoided, while an additional special disadvantage arises from the large volumetric capacity of such installations which demands a correspondingly large and expensive equipment for producing the vacuum.

A common feature of all the processes hitherto referred to is that over-emphasis is placed upon the possibility of drawing off a portion of the volatile substances even before more than a comparatively low temperature has been reached, by the introduction of fresh steam or by blowing in an inert gas.

It has however been found during experiments carried out by the applicant and evaluation of their results that in destructive distillation using conventional methods raw fatty acids can be made to produce a relatively high yield and rendered largely free of odor, the residual odorous substances representing basically decomposition products and polymerizates generated by overheating.

The object of the invention is to provide a process and a device for carrying out the process which is free of the disadvantages above described.

The process is characterized by the fact that sufficient heat is added during the even flow of a mixture conveyed continuously under vacuum so that the first running fraction is evaporated together with a small portion of the middle fraction, whereupon they are separated by rectification into components representing a pure product of first quality and a slightly impure product of second quality at the same time the mixture remaining after separation of the first runnings is continuously vaporized in additional stages and condensed to a product of high purity, the heat energy of the hot vapors and of the hot condensate being utilized for rectification.

The device for carrying out the process is characterized by the fact that an initial evaporator is associated with a condenser arranged in series, the sump of which is connected to a second evaporator with its own serially arranged condenser, and that the sump of this second evaporator is connected to the infeed of a third evaporator, the outlet of which leads to a rectification tower; a pipe connects the condenser of the first evaporator to the rectification tower, and the outlet of the latter opens into a third condenser, all the evaporators and the rectification tower being connected to a vacuum system producing a vacuum which remains regular even in the sumps of the evaporators.

Figure 2:
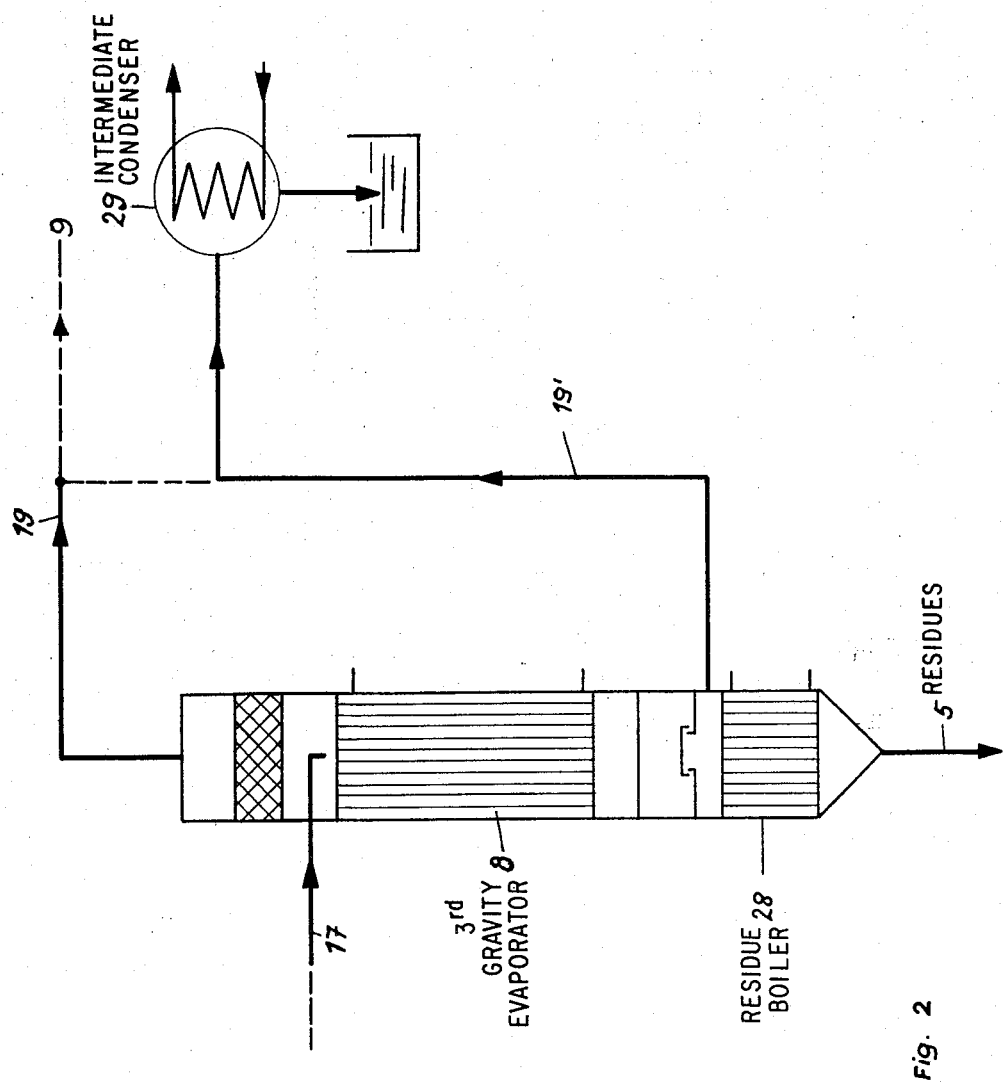

The device and process of the invention are illustrated in the accompanying drawings, in which FIG. 1 shows one embodiment of the proposed device; and FIG. 2 shows a different embodiment, including a residue boiler.

Referring to FIG. 1, the device comprises an initial gravity tube evaporator 6 which is fitted with an infeed pipe 1 for the mixture to be purified. Its sump is connected by means of a connector 14 to the inlet of a second gravity tube evaporator 7, the sump of which is in turn connected via pipe 17 with the inlet of a third gravity tube evaporator 8.

In addition, the first gravity tube evaporator is provided with an outlet pipe 13 which leads to an initial condenser 10. The second evaporator 7 is connected to a second condenser 11 by means of a pipe 16. An outlet pipe 19 leads from the third evaporator 8, into the lower portion of a rectification tower 9, the middle section of which is entered by a pipe 18 coming from the outlet of the first condenser 10.

An outlet 2 of the second condenser 11 and a sump 3 of the rectification tower 9 are connected to a collector tank for the purified product (not illustrated). Finally, a third condenser 12 is also provided and is connected via a pipe 20 to the outlet port of the rectification tower 9.

The outlet from the third condenser 12 leads by way of a pipe 21, to be drawn off at 4 into a collector tank (not illustrated) for a slightly impure product, the said pipe 21 having a branch 22 leading to the upper section of the rectification tower 9 to re-cycle a portion of the slightly impure product through the tower 9. The gravity tube evaporator 8 is furthermore fitted with an outlet pipe 5 through which the residues produced are drawn off.

The device of FIG. 1 operates as follows:

The object is to remove the highly volatile components and residues from a mixture of organic substances, because the former have a tendency to decompose into odor-forming constituents. For this purpose, the raw product is pumped through the pipe 1 into the distribution tray of the gravity tube evaporator 6, after first having been filtered, pre-heated, dehydrated and degassed. The evaporator is under vacuum and the gravity tubes are heated gently high enough for the highly volatile components to be evaporated together with small amounts of the medium and difficultly volatile components. These vapors are condensed in the condenser 10 and are passed while still hot, immediately below vaporization point, through pipe 18 into the central section of the rectification tower 9.

The unvaporized components, that is to say the major portion of the medium and difficultly volatile components of the mixture as well as the residues, are conveyed hot into the distribution tray of the second gravity tube evaporator 7. The tubes of this evaporator are heated to the point at which about 60–80% of the medium and difficultly volatile components are vaporized, while the remainder together with the residues pass on, still hot, into the distribution tray of the third gravity tube evaporator 8.

The product vaporized in the evaporator 7 is condensed in the condenser 11 and continuously drawn off at 2 as first quality product. In the evaporator 8, the difficultly volatile component of the mixture is evaporated to the point where only a very small amount is left in the sump together with the residues and can be drawn off. The vapors from the evaporator 8 are forced into the lower section of the rectification tower 9 and cause to evaporate, as they rise in the column, a highly volatile mixture flowing in from the first condenser 10 at almost vaporization temperature.

The rectification process results in practically all the undesirable, highly volatile impurities being driven off in vapor from through pipe 20, while a first quality product can be drawn off at the bottom of tower 9. The product passing away via the pipe 20 is condensed in the third condenser 12 and in part re-cycled into the tower 9, while the remainder is drawn off at 4.

The evaporators 6 and 7 and the tower 9 are under vacuum (see dotted lines 15), practically no pressure drop occurring right down to the lowest outlet, with the result that it is possible to operate at low temperatures, or in other words under mild conditions.

The process according to the invention will now be described in detail in the following examples.

EXAMPLE 1

In an installation corresponding to the first embodiment shown in FIG. 1 of the drawings, the process was tested by purifying a stearic acid, as this is a case where conditions are recognized as being especially difficult.

A purified, de-aired stearic acid pre-heated to 188° C. flows continuously at about 835 kg./hr. through pipe 1. It consists of the following components, shown in mols percent:

4.4% with a mean C-chain length=10, 19.4% with C=14, 71.5% with C=18 and 4.7% fatty acid glycerine esters and pitch. Approx. 20,000 kcal. heat are applied per hour to the gravity tubes in evaporator 6, as a result of which approx. 139 kg./hr. can be drawn off at the head of the evaporator at a temperature of 197° C. By the withdrawal of approx. 16,000 kcal./hr. in condenser 10, these are cooled and condensed, and the condensate consisting of approx. 23 kg./hr. of C–10, 59 kg./hr. C–14 and 57 kg./hr. C–18 passes into the tower 9 via pipe 18 at a temperature of approx. 162° C.

The remaining 696 kg./hr. pass from the sump of the evaporator 6 through pipe 14 at a temperature of approx. 203° C. into the second evaporator 7, to which are applied approx. 44,000 kcal./hr. Here approx. 495 kg./hr. of 211° C. are evaporated and condensed in the condenser 11 by the withdrawal of approx. 43,000 kcal./hr. The condensate leaves the condenser via 2 at a temperature of about 200° C. and consists of approx. 78 kg./hr. C–14 and 417 kg./hr. C–18. It is of a fine, white appearance and free from odor-releasing impurities.

The outflow through pipe 17 into the third evaporator 8 is about 201 kg./hr. having a temperature of about 214° C. To this is applied about 11,000 kcal./hr., as a result of which approx. 145 kg./hr. evaporate, which consist practically exclusively of fatty acids with a mean C-chain length of 18.

About 56 kg. per hour flow out of the sump of the third evaporator 8, consisting of 50 kg./hr. neutral fat and pitch and 6 kg./hr. C–18.

If it is desired further to reduce the remaining content of approx. 6 kg./hr., it is possible to connect a residue boiler 28 in very simple manner to the base of the evaporator 8, as is shown in FIG. 2.

The residue boiler designated 28 is separate from the evaporator 8 on the vapor side and is heated separately. The increment driven off, consisting on an average of C–18, can be passed into the product from the evaporator 8 by way of a pipe 19' or may be collected directly by means of a small intermediate condenser 29.

The rectification tower 9 is well insulated thermically, and soon after the installation is started up, an equilibrium is arrived at. The infeed in vapor form of 145 kg./hr. at about 214° C. through pipe 19, the infeed of about 139 kg./hr. at 162° C. through pipe 18, and a return feed of about 63 kg./hr. at 140° C. through pipe 22 permit the withdrawal of about 253 kg./hr. at 200° C. at outlet 3 after rectification, with a content of about 51 kg./hr. C-14 and 202 kg./hr. C-18. The liquid is of a neutral white color and can be fed to a cooler together with the product from 2.

At the head of the tower 9, about 94 kg./hr. of highly volatile vapors at 155° C. are drawn off and condensed in the condenser 12 by the withdrawal of some 11,000 kcal./hr. A portion of the condensate is constantly fed back into the upper section of the tower 9, and the remainder, about 31 kg./hr., of a yellowish color and odorous, is fed continuously through pipe 4 into a collector tank for second-quality product. The vacuum maintained in the installation during this process is approx. 2 torr.

To summarize, it may be noted that with an infeed of 835 kg./hr. raw material containing 785 kg./hr. free fatty acids, it is possible to obtain 748 kg./hr. purified first-quality stearic acid corresponding to about 95%, together with another 31 kg./hr. second-quality product (4%). The residue generated has about 10% free fatty acids.

An additional advantage over conventional processes is that practically no losses occur when the vapors pass the vacuum system, so that disadvantageous cleaning processes and mechanical preventive measures are eliminated.

In addition, in the installation of the invention, practically no polymerisation phenomena or decomposition occurs and the amount of accumulated pitch is hardly larger than that of the original fatty acid glycerine esters, which is to a large extent, due to the rapid throughput and the absence of stagnation points.

In addition to the advantage mentioned for the proposed process in relation to a large number of separation operations for the purification of organic substances by means of fractional distillation or condensation hitherto regarded as difficult to perform, the arrangement of the proposed installation also has advantages in other evaporation processes, the number of evaporators, condensers and rectification towers being of course, capable of appropriate variation, if necessary.

Thus, for instance, the proposed device can be utilized for the extraction of fatty acids from oils. For this purpose the rectification tower 9 is cut out, the outlet from the condenser 10 connected to outlet 2 by means of a pipe 23 and the evaporator 8 connected directly to the condenser 12 by a pipe 24.

EXAMPLE 2

A quantity of 1000 kg./hr. of triglycerides with a 10% stearic acid content flows through pipe 1 after having been de-aired, de-slimed, de-colorized and filtered, as necessary, and preheated up to about 210° C. This product temperature is maintained evenly at about 210° C. in the gravity tube evaporators 6, 7 and 8 by addition of heat. The total pressure of 3 torr obtaining in the evaporator 6 is lowered by the addition of water vapor at approx. 30 kg./hr. through a pipe 25 into the sump of the tower to produce an effective partial pressure of about 0.17 torr in the oil/fatty acid mixture.

In this process, 87 kg. of stearic acid and a small trace of oil corresponding to the partial pressure are liquefied together with about 30 kg./hr. of water vapor in the condenser 10. Following this, the procedure is repeated, with direct flow, in the evaporators 7 and 8, with a resulting overflow quantity 14 of 913 kg./hr. oil containing 13 kg./hr. of stearic acid, from which 11.4 kg./hr. of acid is driven off by the addition of approx. 32 kg./hr. of live steam. A total of 901.6 kg./hr. of oil passes across into the evaporator 8, still containing 1.6 kg./hr. of stearic acid.

About 32 kg./hr. of live steam is also blown into the sump of the evaporator 8, with the result that a partial pressure of about 0.0026 torr is set up at this point, thus rendering it possible to drive off a further 1.4 kg. of stearic acid together with the steam. The oil discharged through the pipe 5 contains only 0.2 kg./hr. of stearic acid per 900.2 kg./hr., or a mere 0.022%. The condensates discharged through pipes 2 and 4, with a total of 98.8 kg./hr., stearic acid and only low traces of oil are also collected and further processed.

When applied as illustrated in this example, the utilization of the proposed device again offers major advantages. By comparison, to obtain the same separation effect as in the proposed device at no more than 94 kg./hr., the consumption of conveyor steam for stripping in a single blower would alone be more than 2000 kg./hr.

But the adaptability of the device for the tasks illustrated in the foregoing example is even more far-reaching and permits an even more favorable arrangement to be utilized for the separation of fatty acids from a number of oils, as will be described below.

Flanged connecting ports at pipe 25, as well as 26 and 27 are provided with an adequate diameter, and it has been found that it is also possible to connect the three gravity tube evaporators 6, 7 and 8 in series and to distribute the vacuum as regularly as possible throughout the evaporators right down to the sump of the last one; it is, of course, necessary to ensure that the flanges 25 and 26 are not completely flooded.

In the third evaporator 8 a residue of about 1.05 kg./hr. of fatty acid is driven off by the addition of 27 kg./hr. of steam, this being mainly superheated steam driven off from the evaporator 8 and the advantages are therefore obvious if, in accordance with this example, blowing is carried out direct via flange 26 into the evaporator 7. In the evaporator 7 the superheated steam skims off a further approx. 8.25 kg./hr. of fatty acid, so that a vapor total containing 27 kg./hr. of hot steam and 9.3 kg./hr. of fatty acid is blown through flange 25 into evaporator 6. As a result, from the 835 kg./hr. tristearin flowing in through 1 with a 10% fatty acid content, a further approx. 74.05 kg./hr. fatty acid is taken off in the evaporator 6.

By consequence, the vapors liquified in the condenser 10 contain a total of 27 kg./hr. $H_2O$ and approx. (74.05+8.25+1.05) kg./hr.=83.35 kg./hr. fatty acid. The 751.65 kg./hr. oil flowing off through the pipe 5 contain no more than 0.15 kg./hr. fatty acid. In this experiment, the conveyor steam consumption was thus no more than approx. 0.033 kg./hr. $H_2O$ per kg./hr. infeed material.

At the same time, the partial pressure to be attained for the oil/fatty acid mixture in the three evaporators was adjusted as in the foregoing example. The vacuum in the pipe 15 was connected at 2 torr and reached approx. 3 torr in the evaporator 6, approx. 5 torr in the evaporator 7 and approx. 7 torr in the evaporator 8, which must be regarded as extremely good.

I claim:

1. In a process for the purification of a mixture of organic substances of high molecular weight, which comprises the steps of
    (a) conveying under vacuum the mixture continuously in an even flow through a plurality of heating and cooling zones, while first
    (b) adding sufficient heat to the mixture for
    (c) evaporating substantially all of a first running fraction together with a small portion of a middle fraction, thereby obtaining a distillate; thereafter
    (d) subjecting to rectification the distillate so obtained so as to obtain a pure product of first quality;
    (e) withdrawing the first quality product, thereby leaving behind a product of second quality still containing some slight impurities;

(f) condensing the first quality product, a portion of the condensate being fed into the rectification step (d) and (g) withdrawing the rest;

(h) continuing the purification process by evaporating the second quality product remaining after the withdrawal step (e) by heating up to a degree for the major portion of the middle fraction to escape (i) condensing the same; and (j) withdrawing it;

the improvement comprising the steps of (k) heating the remainder, consisting of residues together with a small portion of the middle fraction, after the withdrawal step (j) in a further stage to a sufficient degree for the residues to be (l) separated from the remains of the middle fraction and (m) drawn off, the remains of the middle fraction being (n) utilized for the rectification step (d), consisting of the first running fraction and a small amount of the middle fraction.

2. The process as defined in claim 1, further comprising the steps of (o) withdrawing the condensate of the middle fraction obtained from the purification step (h); and (p) cooling the same together with the pure middle fraction derived from the rectification step (d).

3. A device for the purification of a mixture of organic substances of high molecular weight, comprising a first evaporator (6) having a sump serially arranged (13) first condenser (10), a second evaporator (7), means (14) for connecting said sump to said second evaporator, a second condenser (11) serially arranged (16) thereto, a sump on said second evaporator, a third evaporator (8), means (17) for connecting said sump of the second evaporator to the infeed of said third evaporator, a rectification tower (9), means (19) for connecting the outlet of said third evaporator to said tower, a pipe (18) for connecting said first condenser to said tower, a third condenser (12), means (20) for connecting the outlet of said tower to said third condenser, a vacuum system (15) with means for connecting said evaporators and said tower thereto, whereby a vacuum is produced which remains approximately even down to said sumps of the evaporators, outlet means (2, 4 and 21, 5, 3) for discharging residues from at least one of said second and said third condensers, said third evaporator and said tower, and means (25, 23, 24) for providing an operative connection between at least one of said second and said first evaporators, said first and said second condensers, as well as said third evaporator and said third condenser.

4. The device as defined in claim 3, further comprising means for connecting said condensers (10, 11, 12) to said vacuum system (15).

5. The device as defined in claim 3, further comprising gravity tubes in said evaporators (6, 7, 8), which operate as continuous-flow evaporators without dividing trays, in which the product forms a flowing film with sufficient space for the vapors to be withdrawn, and means for their withdrawal.

6. The device as defined in claim 3, wherein said tower (9) is a multiple-section tower with an upper section, a central section and a bottom section.

7. The device as defined in claim 6, further comprising a return feed pipe (22) connecting said third condenser (12) to said upper section of the tower (9).

8. The device as defined in claim 6, wherein said pipe (18) between said first condenser (10) and said tower (9) is connected to said central section of the latter.

References Cited

UNITED STATES PATENTS

| 1,552,980 | 9/1925 | Blaise | 202—155 |
|---|---|---|---|
| 2,126,974 | 8/1938 | Reich | 202—174 |
| 2,224,926 | 12/1940 | Potts et al. | 202—205 |
| 2,224,984 | 12/1940 | Potts et al. | 202—153 |
| 2,322,056 | 6/1943 | Potts et al. | 202—205 |
| 2,536,865 | 1/1951 | Anderson | 202—155 |
| 2,894,880 | 7/1959 | Sesson et al. | 203—72 |
| 2,895,886 | 7/1959 | Schneider | 203—72 |
| 3,037,032 | 5/1962 | Kampschmidt | 203—29 |
| 3,135,669 | 6/1964 | Taggart | 203—88 |
| 3,338,799 | 8/1967 | Brandt et al. | 202—155 |
| 3,496,071 | 2/1970 | Spence | 203—72 |

WILBUR L. BASCOMB, Jr., Primary Examiner

U.S. Cl. X.R.

203—74, 77, 78, 80; 202—153, 155, 154, 205; 260—419, 420

UNITED STATES PATENT OFFICE
CERTIFICATE OF CORRECTION

Patent No. 3,697,387　　　　　　　　　Dated October 10, 1972

Inventor(s) H. J. Munch

It is certified that error appears in the above-identified patent and that said Letters Patent are hereby corrected as shown below:

Column 7, lines 31 and 32, change to read -- evaporator (6) having a sump, a serially arranged (13) first condenser (10), a second evaporator (7), means (14) --.

Signed and sealed this 1st day of May 1973.

(SEAL)
Attest:

EDWARD M. FLETCHER, JR.　　　　ROBERT GOTTSCHALK
Attesting Officer　　　　　　　　Commissioner of Patents